United States Patent [19]
Spalding

[11] 3,878,729
[45] Apr. 22, 1975

[54] INSTRUMENT AND METHOD FOR MEASURING AND INDICATING SPEED OF A MOVING, SOUND-EMITTING OBJECT

[76] Inventor: Robert S. Spalding, 550 Lamar Ct., Denver, Colo. 80226

[22] Filed: June 15, 1973

[21] Appl. No.: 370,397

[52] U.S. Cl............................ 73/488; 33/277; 340/5 S
[51] Int. Cl........................... G01p 3/36; G01p 11/00
[58] Field of Search.................. 73/488; 33/1 P, 277; 340/5 S; 181/.5 NP; 356/27

[56] References Cited
UNITED STATES PATENTS 1,495,852  5/1924  Kunze........................... 340/5 S X
1,706,229  3/1929  Hehmsoth......................... 33/277

Primary Examiner—James J. Gill, Jr.

[57] ABSTRACT

A device and method for indicating the speed of a distant moving and sound-emitting object utilizes the difference in the speed of light and the speed of sound to indicate the speed of the object by measuring the angle included between a reference line extending in the direction from which the sound of the object is received and a reference line extending toward the visual image of the object and converting the included angle into a numerical value indicative of the speed of the object.

10 Claims, 5 Drawing Figures

INSTRUMENT AND METHOD FOR MEASURING AND INDICATING SPEED OF A MOVING, SOUND-EMITTING OBJECT

The present invention generally relates to devices and methods for indicating the speed of distant moving and sound-emitting objects and more particularly relates to a new and improved device and method for indicating the speed of a moving and sound-emitting object by utilizing the difference in the speed of light and the speed of sound to establish two reference lines which have an angular relationship proportional to the speed of the moving object.

Although light travels at a much greater speed than sound, to the extent of being virtually at an infinitely greater rate, to applicant's knowledge this physical principle has not been utilized previously to determine the rate of speed of moving and sound-emitting objects, such as, high speed aircraft traveling at speeds in excess of the speed of sound. Rather, other less reliable means have been devised for measuring the speed of an object, by utilizing, for example, the so-called "streamline" or "blur" effect wherein the length of the blurred image created by the moving object is measured and subsequently converted to a speed measurement which is proportional thereto.

Accordingly, it is a primary object of the present invention to provide a new and improved device and method for measuring the speed of a distant moving and sound-emitting object.

It is another object of the present invention to provide a device and method utilizing the difference in the speed of light and the speed of sound to measure the speed of a distant moving and sound-emitting object.

It is another object of the present invention to provide a device which can be aimed in the direction from which sound is received from a moving object and which will reflect the user's line-of-sight toward the visual image of the object so that the speed of the object can be determined from the angle included between a reference line extending in the direction from which the sound is received and a reference line extending toward the visual image of the object.

It is still another object of the present invention to provide a device for measuring the speed of a moving and sound-emitting object which includes a support structure adapted to be aimed in the direction from which the sound from the object is received, a pivotal mirror on the support structure adapted to reflect the line-of-sight of the user toward the visual image of the object and further including a calibrated scale carrying indicia relating to speed so that an indicator arm pivotal with the mirror will indicate the speed of the object on the calibrated scale.

These and other objects of the present invention are attained utilizing the principle that since there is a delay between the time a distant object emits a sound and the time the sound is received by an observer, the object will traverse a given distance during this time proportional to its speed. The distance traveled by the object can be calculated utilizing basic trigonometric functions by measuring or otherwise utilizing the angle included between a reference line pointed in the direction from which the sound is received and a reference line pointed toward the object itself. Of course, it will be appreciated that for the most accurate reading of the speed of the object, the object should be moving along a path which is substantially normal to one of the reference lines. However, the distance between the user of the device and the object itself does not affect the operation of the device.

In one preferred embodiment of a device utilizing the basic principles of the invention, a support structure is adapted to be pointed in the direction from which the sound of the moving object is emitted and includes an assemblage of mirrors which reflect the user's line-of-sight toward the object itself. One mirror in the mirror assemblage is pivotal about a vertical shaft so that the line-of-sight can be reflected through various angles within predetermined limits. The anglular relationship of the pivotal mirror to the support structure on which it is mounted is indicated by an arm which is swingably movable along a calibrated scale carrying indicia relating to speed. The scale is calibrated so that the indicator arm will point to the numerical value of speed corresponding to the actual speed of the object as determined by the angle included between a reference line pointed in the direction from which the sound is received and a reference line pointing in the direction of the object itself. The device and method utilized are best suited for measuring and indicating the speed of aircraft or similar rapidly moving objects which are capable of traveling at speeds in excess of the speed of sound.

Other objects, advantages and features of the present invention will become more apparent as the description proceeds taken in conjunction with the accompanying drawings, in which.

Figure 1:
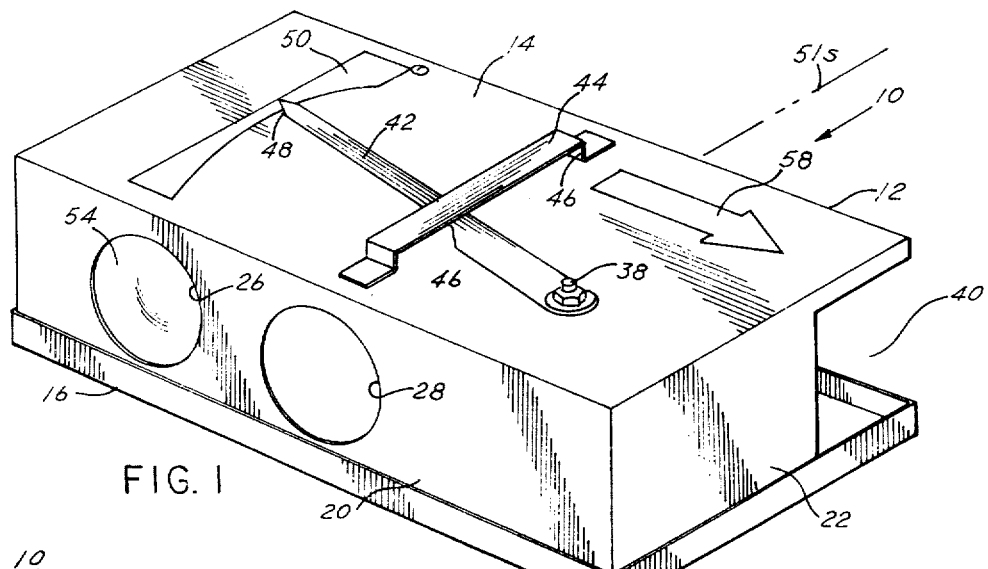
FIG. 1 is a perspective view of an indicator device utilizing the principles of the present invention.
Figure 3:
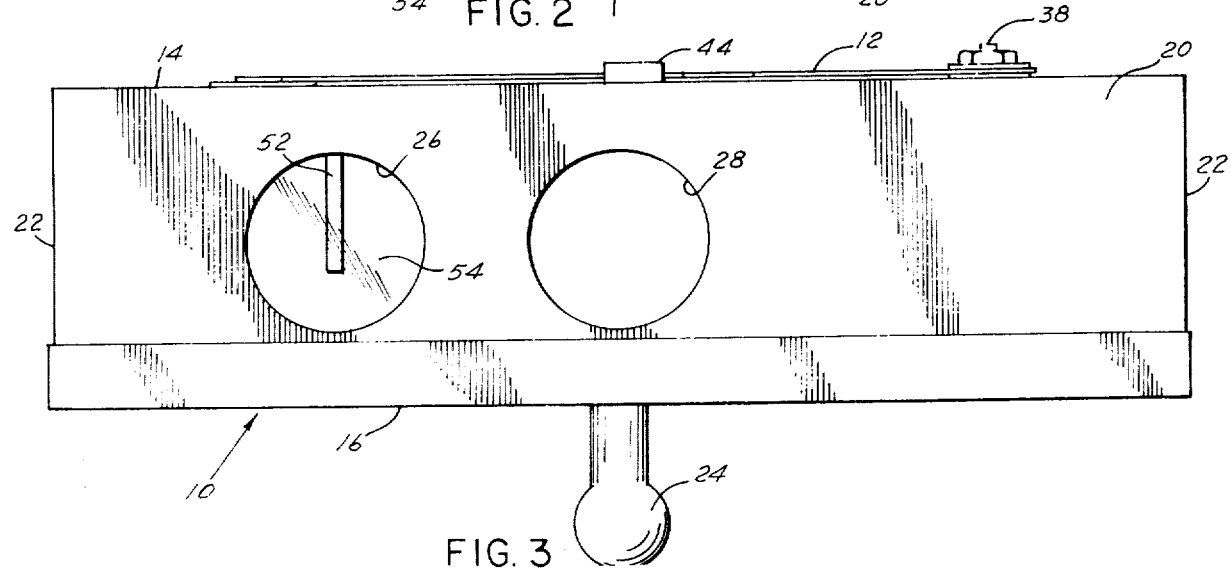
FIG. 3 is a rear elevation of the device of FIG. 2.
Figure 4:
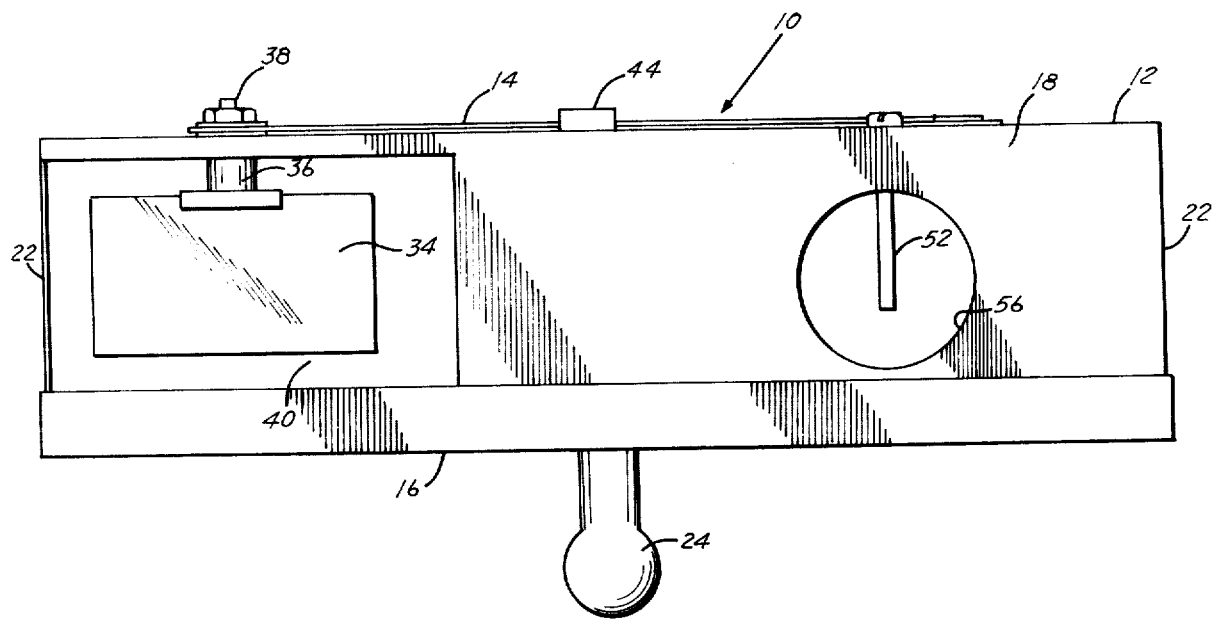
FIG. 4 is a front elevation of the device of FIG 2.
Figure 5:
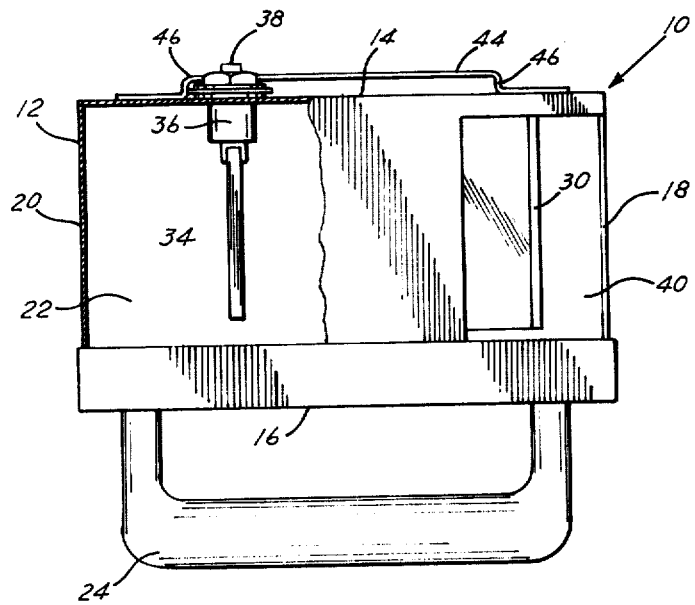
FIG. 5 is a side elevation of the device of FIG. 2 with parts removed for clarity.

A preferred embodiment of an indicating device 10 utilizing the principles of the present invention is seen in FIG. 1 to include an outer rectangular box-like housing 12 having top and bottom walls 14 and 16, respectively, front and rear walls 18 and 20, respectively, and side walls 22. As best seen in FIGS 3, 4 and 5, a handle 24 may be attached at a central location to the bottom wall 16 of the housing to facilitate manipulation of the device by allowing the device to be conveniently stabilized with one hand.

Figure 2:
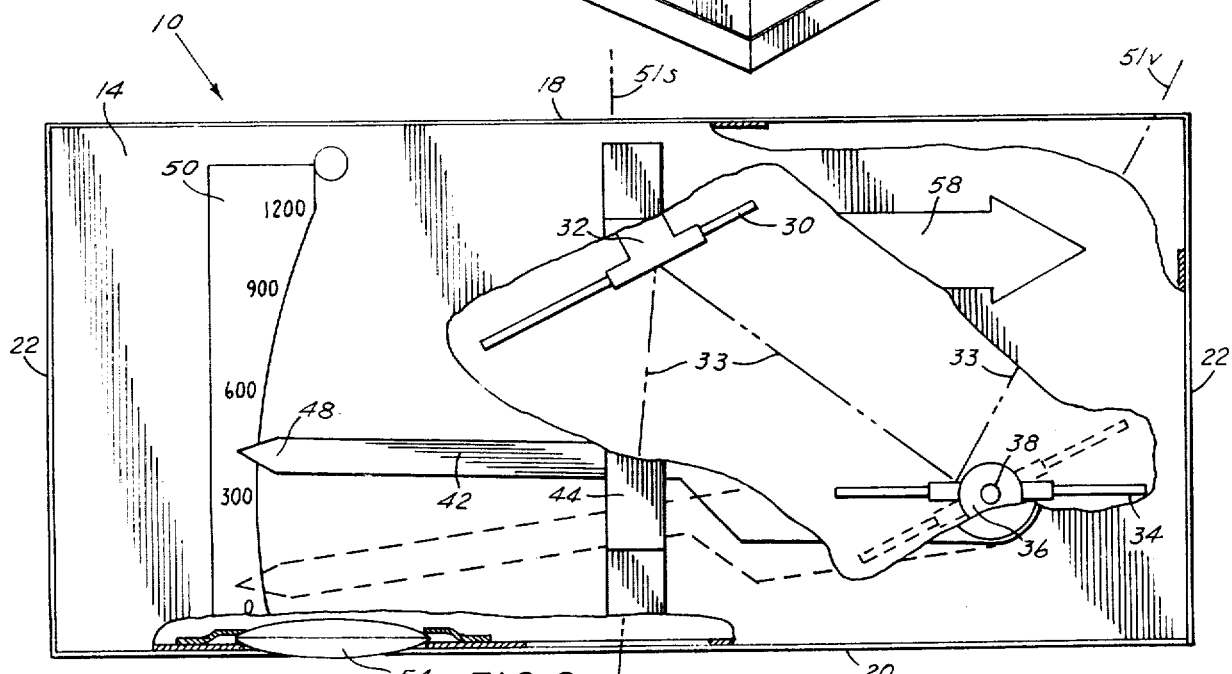
FIG. 2 is an enlarged top plan view of the device of FIG. 1 with parts removed for clarity.

The rear wall 20 of the housing 12 is seen to have a pair of circular viewing apertures 26 and 28 adapted to be respectively aligned with the user's eyes so that the left eye sees through one of the viewing apertures and the right eye sees through the other. The aperture 28 which is substantially centrally located along the length of the rear wall 20 is aligned in a front-to-rear direction with a fixed mirror 30 adjacent the front wall 18 of the housing 12 which forms approximately a 30° angle with the rear wall 20. The fixed mirror 30 is mounted in a bracket 32 anchored to the top wall 14 of the housing so as to remain immovable relative to the housing. It will, therefore, be seen that the user's line-of-sight 33 through the centrally located aperture 28 is reflected rearwardly by the stationary mirror 30 at approximately a 60° angle to the rear wall 20 and toward a pivotal mirror 34 disposed within the housing 12 and adjacent to the rear wall 20 and the right side wall 22 as viewed in FIG. 2. The pivotal mirror 34 is mounted on a bracket 36 anchored to a pivot shaft 38 which passes through the top wall 14 of the housing. Of course, the angular relationship between the pivotal mirror 34 and the housing 12 of the device will determine the direction in which the user's line-of-sight will leave the housing since the stationary mirror 30 remains fixed relative to the housing. The user's line-of-sight 33 is, therefore, reflected from the stationary mirror 30 to the pivotal mirror 34 and subsequently through a viewing window 40 provided in the front wall 18 of the housing and extending around and rearwardly along the right side wall 22 of the housing as viewed in FIG. 1. The window 40 is best seen in FIGS 1, 4 and 5 and need only extend approximately one-third of the length of the front and right side walls 18 and 22 respectively in order to give a suitable range of view to operate the device.

An indicator arm 42 is fixed at one end to the pivot shaft 38 of the pivotal mirror 34 for unitary pivotal movement therewith across the upper surface of the top wall 14 of the housing 12. The indicator arm 42 is conveniently disposed for manipulation by the user's free hand so that by swinging the indicator arm 42 across the top surface 14 of the housing, the pivotal mirror 34 can be moved through corresponding angles to reflect the user's line-of-sight 33 toward the moving object. A raised guide bracket 44 is anchored to the top 14 of the housing 12 in overlying relationship with the indicator arm 42 and has abutment surfaces 46 at opposite ends thereof to limit movement of the indicator arm 42 and consequently of the pivotal mirror 34. The distal end 48 of the indicator arm 42 is pointed and adapted to move along a calibrated scale 50 affixed to the top wall 14 of the housing 12 and having indicia thereon relating to speed.

The scale is properly calibrated so that when the user's line-of-sight 33 is directed at the moving object via the fixed and pivotal mirrors 30 and 34, respectively, the pointed distal end 48 of the indicator arm 42 will point to the location on the calibrated scale 50 corresponding to the speed of the object. It will be readily appreciated that from basic trigonometry, the scale 50 can be easily calibrated from the various angular relationships of the pivotal mirror 34 with the housing 12. In other words, the angular relationship of the pivotal mirror 34 with the housing corresponds to the angular relationship of a reference line 51s extending in the direction from which the sound is received and a reference line 51v directed toward the object itself. Utilizing this angle and basic trigonometric functions, a measurement of the distance the object travels during the time it takes the emanated sound to reach the observer can be calculated and properly transposed to the scale 50 as a speed measurement since this distance will be directly proportional to the speed of the object. By way of illustration, if $\theta$ represents the angle included between the reference lines 51s and the reference line 51v, then the tangent of $\theta$ will give a close approximation to a value which is porportional to the speed of the object if the object is moving along a path substantially normal to reference line 51s or reference line 51v. This value can be converted to the actual speed of the object by use of an appropriate conversion factor which can be determined from experiment such as by determining the angle $\theta$ corresponding to the known speed of a moving object. After the conversion factor has been determined, a table, such as shown below, can be tabulated and the scale 50 calibrated from the information in the table. It should be appreciated that since, in the disclosed embodiment, a fixed mirror is used to reflect the user's line-of-sight to the pivotal mirror, the angle the pivotal mirror makes with reference line 51s will only be approximately one-half the angle included between the reference lines 51s and 51v and this is shown in Table I.

TABLE I

| Speed | Angle Between 51s and 51v | Angle Between Pivotal Mirror and 51s |
|---|---|---|
| 92 mph | 7° | 3.5° |
| 370 mph | 26.5° | 13° |
| 742 mph | 45° | 22.5° |
| 1000 mph | 53.5° | 26° |
| 1500 mph | 65.5° | 33° |
| 2000 mph | 69.6° | 35° |

In order to accurately align the user's line-of-sight 33 with the moving object and thereby improve the accuracy of the indicator device 10, a reference pin 52 passes downwardly through the top wall 14 in front-to-rear alignment with the viewing aperture 26. The reference pin 52 thereby serves the same purpose as a conventional cross-hair in accurately establishing the visual location of the moving object. It has been found that by placing a convex lens 54 in the viewing aperture 26, having a focal length approximately equal to the spacing between the reference pin 52 and the rear wall 20, that the reference pin 52 will be perfectly focused for the user and will condition the user's eyes such that the image seen with the eye looking through the centrally located viewing aperture 28 will be superimposed on the reference pin 52. In this manner, the moving object can be aligned with the reference pin 52 to accurately position the pivotal mirror 34 relative to the housing 12 in establishing the angle defined by the reference line 51s passing from the indicator device 10 in the direction from which the sound of the moving object is received and the reference line 51v directed at the moving object itself.

A light window 56 is aligned with the lens 54 in a front-to-rear direction so as to be positioned immediately behind the reference pin 52 and thereby give a lighted backdrop for the reference pin 52 so that it is optimally illuminated and easily visible through the lens 54.

It is readily apparent that if the object is moving in a left-to-right direction, the device would be held with the handle 24 directed downwardly so that an arrow 58 on the top wall 14 of the device would be pointed in the direction of movement of the object. If, however, the object were moving in an opposite right-to-left direction, the device could be inverted and held with the handle 24 directed upwardly so that an arrow on the bottom wall 16, not shown, would point in the direction of movement of the object.

It can accordingly be appreciated that an indicator device 10 has been described which utilizes the difference in the speed of light and the speed of sound to determine the speed of a distant moving, sound-emitting object. The accuracy of the device improves with the speed of the object and is also dependent upon the path of movement of the object. In other words, for most accurate measurements, the object should be moving at speeds close to or greater than sound and should be moving along a path which is normal to one of the reference lines 51s or 51v. While numerous devices may be devised employing the basic concepts of applicant's invention, it is felt that the particular embodiment described herein is easy to operate and gives a reasonably accurate indication of the speed of the moving object.

Although the present invention has been described with a certain degree of particularity, it is understood that the present disclosure has been made by way of example and that changes in details of structure may be made without departing from the spirit thereof.

What is claimed is:

1. A device for indicating the speed of a distant moving and sound-emitting object comprising in combination:
    first pointer means adapted to be directed from a reference point in the direction of the object at the point that sound emitted from the object is received,
    second pointer means adapted to be directed from said reference point at the object at the point that sound is emitted from the object,
    light-reflective members associated with said first and second pointer means and movable with said first pointer means for permitting optical following of the object by said first pointer means while said second pointer means remains directed toward the said point that sound was emitted by the object, and
    indicator means adapted to cooperate with said first and second pointer means in converting the angle included between said first and second pointer means into a numerical value indicative of the speed of the object.

2. The device of claim 1 wherein said first and second pointer means are pivotally connected at said reference point.

3. The device of claim 2 wherein said light-reflective members includes selectively adjustable reflector means mounted on said first and second pointer means such that a user's line-of-sight can be diverted by the reflector means toward the object when the first pointer means is pointed in the direction from which the sound from the object is received.

4. The device of claim 3 wherein said reflector means mounted on said first pointer means is stationary relative to said first pointer means and positioned relative to said first pointer means and positioned relative to the other reflector means so that the user's line-of-sight can be reflected from the reflector means on said first pointer means to the reflector means on said second pointer means.

5. The device of claim 4 wherein said first pointer means includes a viewing aperture aligned with said reflector means on said first pointer means whereby the user of the apparatus can look through said viewing aperture and having his line-of-sight reflected by said reflector means on said first pointer means to said other reflector means and from said other reflector means toward said object.

6. The device of claim 5 further including a reference pin on said first pointer means and a second viewing aperture in said first pointer means aligned with said reference pin and spaced from said first mentioned viewing aperture such that the user can look through said first mentioned viewing aperture with one eye and through said second viewing aperture wtih the other eye so that said object seen with one eye via said reflector means can be aligned visually with said reference pin to accurately define the angle between said first and second pointer means.

7. The device of claim 5 wherein said indicator means includes a calibrated scale carried by said first pointer means and further includes an indicator arm operatively connected to said other reflector means for unitary pivotal movement therewith and positioned to move along said calibrated scale to indicate on the scale a figure proportional to the angle included between said first pointer means and the other reflector means.

8. A device for indicating the speed of a distant moving and sound-emitting object comprising:
    a box having a front and rear wall, the front wall being adapted to be pointed along a first reference line in the direction from which the sound is received,
    a first mirror pivotally mounted in the box,
    a second mirror fixedly mounted in the box and positioned relative to said first mirror so that a user's line of sight can be reflected from the second mirror to the first mirror,
    a first viewing aperture in said rear wall of the box aligned in a front-to-rear direction with said second mirror,
    a viewing window in the front wall of the box aligned in a front-to-rear direction with said first mirror so that the user's line-of-sight can be reflected by the first and second mirrors through the viewing window and along a second reference line toward the moving object,
    a reference pin fixedly mounted in said box in spaced relation from said second mirror,
    a second viewing aperture in the rear wall of the box aligned in a front-to-rear direction with said reference line and spaced from said second viewing aperture such that the user can look through the first viewing aperture with one eye and the second viewing aperture with the other eye when using the device so that said object seen with said one eye via said first and second mirrors can be aligned visually with said reference pin to accurately define the angle included between the first mirror and a reference line normal to the front wall of the box when the reference line is pointed in the direction from which the sound is emitted,
    a calibrated scale on an exterior face of the box having indicia which is proportional to the tangent of the angle included between said first and second reference lines, said indicia relating to the speed of the object, and
    an indicator arm operatively connected to said first mirror for unitary pivotal movement therewith relative to the box and positioned to move along said calibrated scale to indicate on the scale the speed of the moving object.

9. A method of measuring the speed of a distant moving and sound-emitting object comprising the step of:
    establishing a first reference line directed toward the sound emitted from the object,
    establishing a second reference line directed toward the object, and
    converting the angle included between said first and second reference lines into a numerical value indicative of the speed of the object.

10. The method of claim 9 wherein said angle is converted by establishing the tangent of the angle and multiplying the tangent of the angle by a conversion factor to give the speed of the object.

* * * * *